US011030177B1

(12) United States Patent
Slayton et al.

(10) Patent No.: US 11,030,177 B1
(45) Date of Patent: Jun. 8, 2021

(54) SELECTIVELY SCANNING PORTIONS OF A MULTIDIMENSIONAL INDEX FOR PROCESSING QUERIES

(71) Applicant: Amazon Technologies, Inc., Seattle, WA (US)

(72) Inventors: Zachary Paul Slayton, New York, NY (US); Matthew S. Canterbury, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 433 days.

(21) Appl. No.: 15/587,329

(22) Filed: May 4, 2017

(51) Int. Cl.
*G06F 16/22* (2019.01)
*G06F 16/2455* (2019.01)

(52) U.S. Cl.
CPC ...... *G06F 16/2264* (2019.01); *G06F 16/2282* (2019.01); *G06F 16/2455* (2019.01)

(58) Field of Classification Search
CPC ............. G06F 16/2264; G06F 16/2282; G06F 16/2455
See application file for complete search history.

(56) References Cited

U.S. PATENT DOCUMENTS

| | | | |
|---|---|---|---|
| 5,483,651 A * | 1/1996 | Adams | G06F 17/245 |
| 6,272,487 B1 | 8/2001 | Beavin et al. | |
| 7,120,623 B2 | 10/2006 | Ganesan et al. | |
| 7,376,638 B2 | 5/2008 | Gordon | |
| 8,688,723 B2 | 4/2014 | Zhang et al. | |
| 2004/0177065 A1* | 9/2004 | Tropf | G06F 16/2264 |
| 2010/0057847 A1* | 3/2010 | He | H04L 67/02 |
| | | | 709/203 |
| 2010/0082654 A1* | 4/2010 | Zhang | G06F 16/283 |
| | | | 707/759 |
| 2011/0202929 A1* | 8/2011 | Schleimer | G06F 16/24549 |
| | | | 718/106 |
| 2012/0330954 A1* | 12/2012 | Sivasubramanian | |
| | | | G06F 9/5061 |
| | | | 707/737 |
| 2014/0019995 A1* | 1/2014 | Frank | G06F 9/542 |
| | | | 719/318 |

(Continued)

FOREIGN PATENT DOCUMENTS

WO WO-2011130706 A2 * 10/2011 ......... G06F 16/2425

OTHER PUBLICATIONS

Multidimensional Range Search in Dynamically Balanced Trees, H. Tropf, H. Herzog, Applied Informatics, pp. 71-77, issue 2, 1981.
(Continued)

*Primary Examiner* — James Trujillo
*Assistant Examiner* — Michael Bogacki
(74) *Attorney, Agent, or Firm* — Robert C. Kowert; Kowert, Hood, Munyon, Rankin & Goetzel, P.C.

(57) ABSTRACT

Portions of a multidimensional index for a database table may be selectively scanned for processing queries. A query may be received for a database table with a multidimensional index. A range of the multidimensional index may be identified for processing the query. Items mapped to different portions of the query may be scanned to apply the query. Some portions adjacent to a scanned portion may be skipped upon a determination that the adjacent portion does not include items that can satisfy the query. A result based on the scan operations can be provided in response to the query.

19 Claims, 10 Drawing Sheets

(56) References Cited

U.S. PATENT DOCUMENTS

| | | | | |
|---|---|---|---|---|
| 2014/0032981 A1* | 1/2014 | Ahmed | ............... | G06F 11/1482 |
| | | | | 714/49 |
| 2014/0201129 A1* | 7/2014 | Gupta | .................. | G06F 16/278 |
| | | | | 707/602 |
| 2015/0286682 A1* | 10/2015 | Ziauddin | ........... | G06F 16/24554 |
| | | | | 707/718 |
| 2015/0310047 A1* | 10/2015 | Zhou | .................. | G06F 16/2264 |
| | | | | 707/737 |
| 2016/0171002 A1* | 6/2016 | Bendel | ................. | G06F 16/122 |
| | | | | 707/714 |
| 2016/0224660 A1* | 8/2016 | Munk | .................. | G06F 16/316 |
| 2017/0193041 A1* | 7/2017 | Fuchs | ................ | G06F 16/2453 |

OTHER PUBLICATIONS

U.S. Appl. No. 13/953,432, filed Jul. 29, 2013, Anurag Windlass Gupta.

\* cited by examiner

SELECTIVELY SCANNING PORTIONS OF A MULTIDIMENSIONAL INDEX FOR PROCESSING QUERIES

BACKGROUND

Indexing schemes provide data management systems, such as databases, with fast querying capabilities. Instead of scanning an entire data set, the data management system may apply search criteria, such as query predicates, to the evaluation of an index, which may be optimized to map the location of data satisfying the search criteria to portions of the index. Multidimensional indexes further optimize querying capabilities by increasing the number of dimensions, such as table columns, that may be mapped, and thus quickly found, when processing a search request. Techniques that implement and enhance the performance of multidimensional indexes are highly desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to selectively scan portions of a multidimensional index for processing queries. In various embodiments, multidimensional indexes may be generated and maintained for data sets, such as database tables, stored in a database, that are accessed, evaluated, or otherwise scanned, in order to process queries to a database table for which the multidimensional index is generated. Different dimensions, such as different columns, attributes, fields, or other data included within an item (e.g., data object, record, row, etc.) may be included within the multidimensional index so that the multidimensional index may increase the speed at which queries that specify data from the different dimensions can be processed, in some embodiments.

Figure 1:
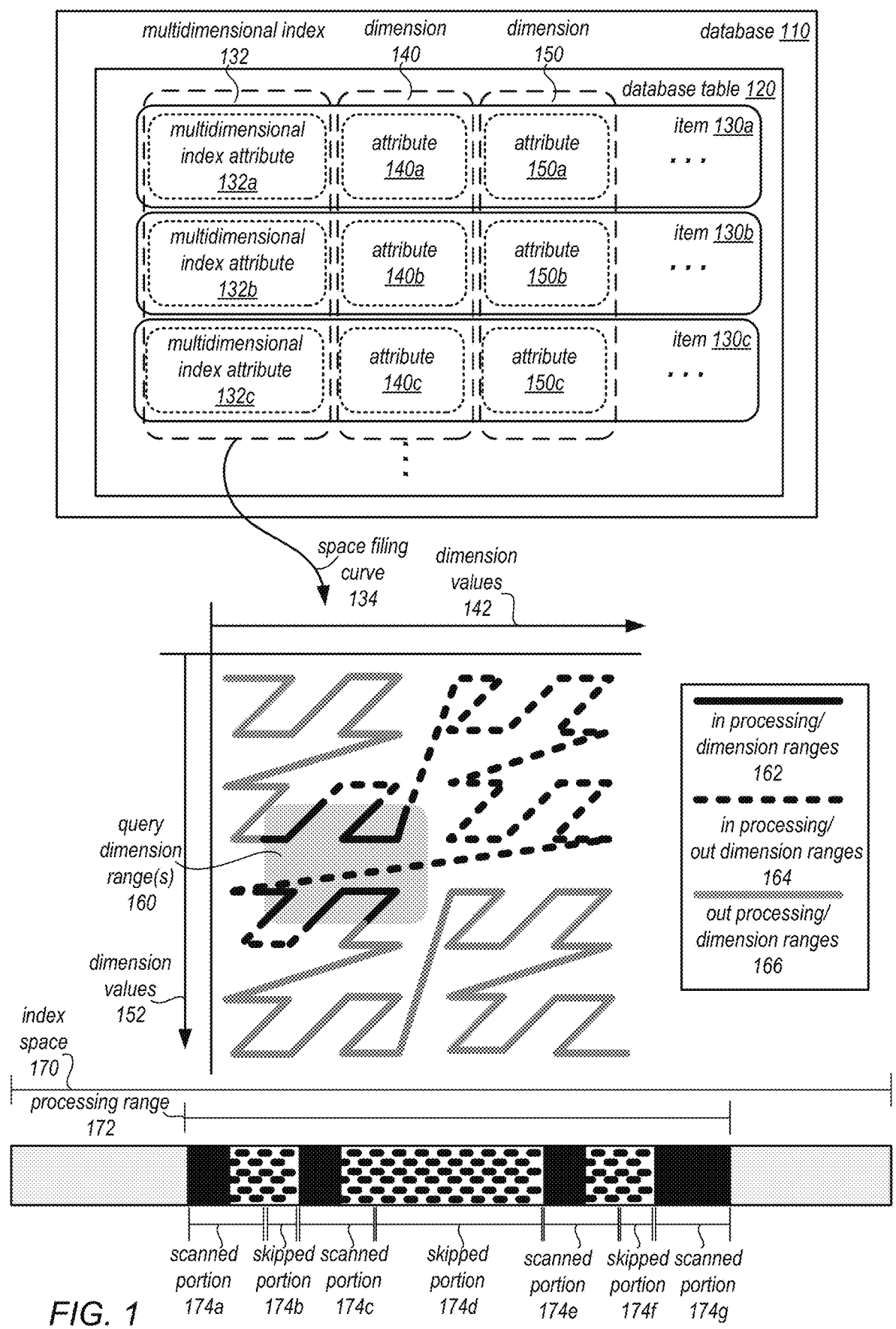
FIG. 1 is a logical block diagram illustrating selectively scanning portions of a multidimensional index for processing queries, according to some embodiments.

Selectively scanning portions of a multidimensional index can further increase the performance benefits of a multidimensional index by excluding or otherwise skipping over portions of a multidimensional index for which it can be determined do not include items that satisfy a given query, in various embodiments. In this way Input/Output (IO) bandwidth and time costs, processor capacity for scanning index portions, and/or network communication bandwidth and time costs can be reduced if irrelevant portions of an index are skipped when processing a query. FIG. 1 is a logical block diagram illustrating selectively scanning portions of a multidimensional index for processing queries, according to some embodiments.

Database 110 may be a relational or non-relational (e.g. NoSQL) database that stores a database table 120 on behalf of clients, in various embodiments. Database table 120 may include multiple items (e.g., rows, records, or other data objects), such as items 130a, 130b, and 130c, which may respectively include attributes (e.g., columns, fields, or other data values), such as attributes 132a, 132b, 132c, 140a, 140b, 140c, 150a, 150b, and 150c, in some embodiments. In order to process queries with respect to different dimensions (e.g., columns, same attributes, etc.), such as dimensions 140 and 150, in items 130, multidimensional index 132 may be implemented by including a multidimensional index value, such as multidimensional index values 132a, 132b, and 132c, in each item 130 database table 120, in some embodiments. Items 130 may be stored in a sorted order according to the multidimensional index attributes 132 so that items with similar values may be similarly located, reducing I/O operations to retrieve them. In this way, queries directed to one or more of dimensions 140 and/or 150 may be processed utilizing multidimensional index 132 to efficiently locate and return items 130 that satisfy query predicates, in some embodiments. For example, range queries that specify range(s) of value(s) for attribute(s) can be processed by determining the range of multidimensional index values mapped to the range(s) in order to process the range queries.

Multidimensional index 132 may be generated in different ways. In some embodiments, dimension index values may be concatenated or combined to create a multidimensional index value. In at least some embodiments, a space filling curve 134, such as illustrated in FIG. 1, may be used to generate a multidimensional index. For example, a Z-order curve as illustrated in FIG. 1 may map each dimension, such as dimensions 140 and 150 into a single dimension, the illustrated space filling curve 134. So as dimension values 142 and 152 increase, the space filling curve 134 includes the possible combination of dimension values, in some embodiments. In this way, a space filling curve may preserve the locality of similar dimensional values of items, without weighting any one dimension more than another, in one embodiment. Please note that more 2 dimensions can be implemented in a multidimensional index and the previous examples are not intended to be limiting.

To process a query using a multidimensional index, the query dimension ranges 160 may be determined, in some embodiments. For example, a query can have a predicate for dimension 140 include values "A" to "C" and another predicate for dimension 150 with predicate values "F" to "J." For a space filling curve like the illustrated Z-order curve, query dimension range(s) 160 may be identified as a query rectangle (e.g., or 3, 4, or 5 dimensional shape corresponding to the number of dimensions in the multidimensional index 132). The query dimension range(s) 160 may identify the range of index values that can include items that satisfy the query, as discussed below with regard to FIG. 8. For example, the index values begin in the top left corner of the curve in the illustrated example. The curve may be traced and pass by index values not included in the query rectangle. Once the line enters the query rectangle (e.g., dimension range(s) 160), then a minimum index range value may be determined at the index value of the point in the line where the line transitions from outside of the processing and dimension ranges 166 to within 162 the query dimension ranges 160 (e.g., within gray line crosses into the query rectangle and becomes solid black). Depending on the space filling curve, a line may travel in and out of query dimension ranges 160 (as illustrated by the dotted line portion 164), in some embodiments. However, until the line has left (and does not return), then that portion of the line 164 may be considered within the single processing range 172 for the query (e.g., scanning items within the single range will return all items that satisfy the query).

The bar graph below the space filling curve 134 illustrates these concepts. For example, index space 170 may represent all possible index values according to the space filling curve 134. Processing range 172 may represent a single range of index values that includes all items that can satisfy a query. In various embodiments, different portions of the processing range of multidimensional index may be selectively scanned so that as few of the portions within the processing range but outside of the dimension ranges 164 are scanned, saving processing time and costs (as noted above). For example, scanning of portions of the range may be incrementally performed (as discussed below with regard to FIGS. 7 and 8) in order to scan a portion, such as portion 174a, and then evaluate whether an adjacent portion includes items that can satisfy the query. If not, the skipped portion 174b may be determined and not scanned. Scanning may resume upon determining another portion 174c that is within dimension ranges 166. Incremental scans and skips (identified by reference characters 174d, 174e, 174f, and 174g) can continue so that large portions of the index 132 that are not relevant, like 174d and 174f, can be dynamically identified and skipped as processing of the query is performed. In this way, time and processing costs to calculate the portions of the index that are within the range and dimension ranges 162 and outside of dimension ranges 164 can be determined on the fly, without incurrence an upfront performance penalty to calculate the ranges ahead of time, in some embodiments, (or in circumstances where queries to scan a batch or group of specific sub-ranges can be issued at the same time). In embodiments, where a database client implements selectively scanning portions of the multidimensional index, reducing the number of scan requests sent to a database can improve the performance of processing the query (in scenarios where the portions to be scanned are frequently intermixed with irrelevant portions of the index).

Please note that previous descriptions of selectively scanning portions of the multidimensional index for processing queries are not intended to be limiting, but are merely provided as logical examples. Different implementations of multidimensional index, database table, database, database schema, or space filling curve can be envisioned.

This specification begins with a general description of a database client and a provider network that implements a database service for selectively scanning portions of the multidimensional index for processing queries directed to a database table in the database service, in one embodiment. Then various examples of a database service and database client are discussed, including different components/modules, or arrangements of components/module, that may be employed as part of implementing the database service and database client, in one embodiment. A number of different methods and techniques to implement selectively scanning portions of the multidimensional index for processing queries are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
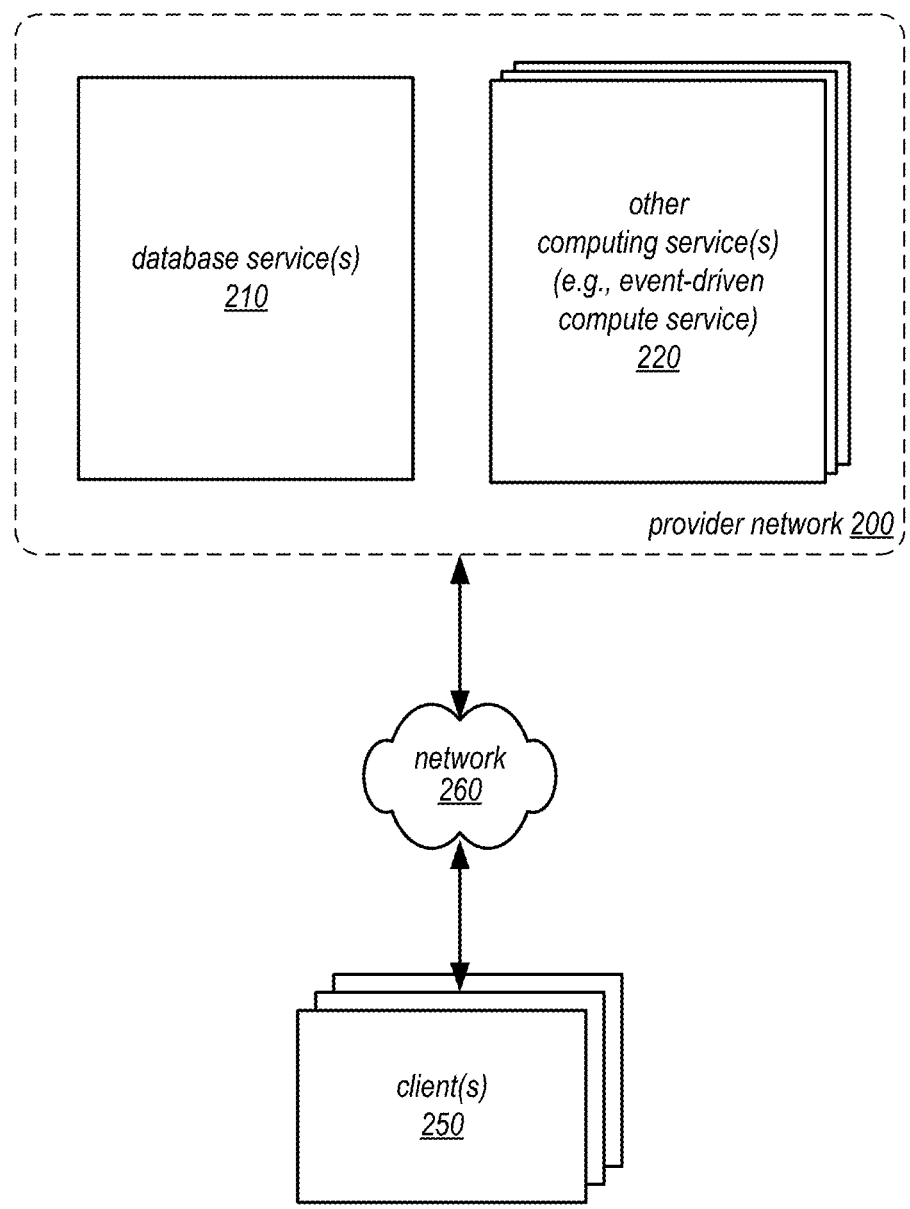
FIG. 2 is a logical block diagram illustrating a provider network implementing a database service, according to some embodiments.

FIG. 2 is a logical block diagram illustrating a provider network implementing a database service, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 250, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In one embodiment, provider network 200 may implement various computing resources or services, such as database service(s) 210 such as relational or non-relational (NoSQL) database query engines, map reduce processing, data warehouse, data flow processing, and/or other large scale data processing techniques), or other storage services, such as data storage services (e.g., an object storage service, block-based storage service, or data storage service that may store different types of data for centralized access), virtual compute services, event-driven computing services, and/or any other type of network based services (which may include various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 10 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may also be any of various types of data processing services to perform different functions (e.g., query or other processing engines to perform functions such as anomaly detection, machine learning, data lookup, or any other type of data processing operation). For example, in at least one embodiment, database service(s) 210 may include a map reduce service that creates clusters of processing nodes that implement map reduce functionality over data stored in one of data storage services 220. Various other distributed processing architectures and techniques may be implemented by database service(s) 210 (e.g., grid computing, sharding, distributed hashing, etc.) in another embodiment.

In at least some embodiments, other computing services 220 may include an event-driven computing service. The event-driven compute service may maintain a pool of pre-initialized virtual machine instances that are ready for use as soon as a request is received to execute a function or other program code, in various embodiments. The event driven compute service may maintain a pool of virtual machine instances that have one or more software components (e.g., operating systems, language runtimes, libraries, etc.) loaded thereon. The virtual machine instances in the pool may be designated to service requests to execute functions or other program codes, in some embodiments. The functions or other program codes can be executed in isolated containers that are created on the virtual machine instances, in some embodiments or separate physical servers, hosts, or computing devices. Since the virtual machine instances in the pool have already been booted and loaded with particular operating systems and language runtimes by the time the requests are received, a delay associated with finding compute capacity that can handle the requests (e.g., by executing the functions or other program codes in one or more containers created on the virtual machine instances) may be significantly reduced, in some embodiments.

In some embodiments, the event-driven compute service may facilitate transportation or communication of event messages generated in a first programmatic environment (e.g., a database client as discussed below with regard to FIG. 4B). To further facilitate propagation and transportation of a triggered event from the first programmatic environment to the event driven compute service, event messages may be generated to include information descriptive of the triggered event, a user associated with a request to execute functions or other program codes in response to the triggered event, and programmatic information to enable the event driven compute service to convert the event message into a request for further processing by the event driven compute service. The event message and/or programmatic information contained therein may be structured according to a schema, a code model, or an application programming interface ("API"), console, command-line or graphical user interface or any other interface to facilitate both creation/generation of the event message at the auxiliary service and conversion/processing of the event message at the event driven compute service, in some embodiments.

The event driven compute service may perform automatic rate matching and scaling between events being triggered on an auxiliary service and the corresponding execution of functions or other program codes on various virtual machine instances, in some embodiments. Thus, event driven compute service is capable of responding to events on-demand, whether the events are triggered infrequently (e.g., once per day) or on a larger scale (e.g., hundreds or thousands per second), in some embodiments. However, in some scenarios various considerations may create a need to impose limitations on the immediate availability of virtual machine instances. For example, the physical computing devices that implement the event driven compute service may reach capacity, having allocated all available resources. In another example, the event driven compute service's users may have service agreements that limit access to resources, in some embodiments. The event driven compute service may implement a resource allocation limit, such as a limit on concurrently instantiated virtual machines by the user, or on concurrent executions of the user's functions or other program code. Since the requests to execute functions or other program codes may be processed asynchronously, requests for the functions or other program codes (i.e., event messages) that arrive when the event-driven compute service is operating at the concurrent execution limit (of, e.g., 50 concurrent executions) may not be rejected, in some embodiments.

Functions or program code executed by the event driven compute service may be any program code (e.g., a program, routine, subroutine, thread, etc.) written in a program language or programming paradigm (e.g., automatically generated code based on user-specified steps, operations, or other representations of functionality), in some embodiments. For example, the code may perform operations to generate a multidimensional index value based on input values and send a request to update an item in a database table that includes the generated multidimensional index value. Such functions or other program codes may be executed to achieve a specific task, in some embodiments-such as in connection with an event generated by database client 420 in FIG. 4B. The functions or other program codes may be written in JavaScript (node.js), Java, Python, and/or Ruby. The request and/or corresponding event message may include an identifier of the event used to identify the function (and location thereof), and one or more arguments/parameters to be used for executing the function or program code, in one embodiment. For example, the user may provide the function or other program code along with the request to execute the function or program code in response to the occurrence of one or more events, in one embodiment.

In one embodiment, clients 250 may encompass any type of client configurable to submit network-based requests to provider network 200 via network 260, including requests for database service(s) 210 (e.g., to query a database 210) or other service(s) 220. For example, in one embodiment a given client 250 may include a suitable version of a web browser, or may include a plug-in module or other type of code module may execute as an extension to or within an execution environment provided by a web browser. Alternatively in a different embodiment, a client 250 may encompass an application such as a database application (or user interface thereof), a media application, an office application or any other application that may make use of storage resources in database service(s) 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200, in one embodiment. In one embodiment, client 250 may generate network-based services requests according to a Representational State Transfer (REST)-style network-based services architecture, document-based or message-based network-based services architecture, or other suitable network-based services architecture.

In one embodiment, a client 250 may provide access to provider network 200 to other applications in a manner that is transparent to those applications. For example, client 250 may integrate with an operating system or file system to provide storage on one of database service(s) 210. However, the operating system or file system may present a different storage interface to applications, such as a conventional file system hierarchy of files, directories and/or folders. In such an embodiment, applications may not need to be modified to make use of the storage system service model. Instead, the details of interfacing to the database service(s) 210 may be coordinated by client 250 and the operating system or file system on behalf of applications executing within the operating system environment.

Clients 250 may convey network-based services requests to and receive responses from provider network 200 via network 260, in one embodiment. In one embodiment, network 260 may encompass any suitable combination of networking hardware and protocols necessary to establish network-based-based communications between clients 250 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in one embodiment, clients 250 may communicate with provider network 200 using a private network rather than the public Internet.

Figure 3:
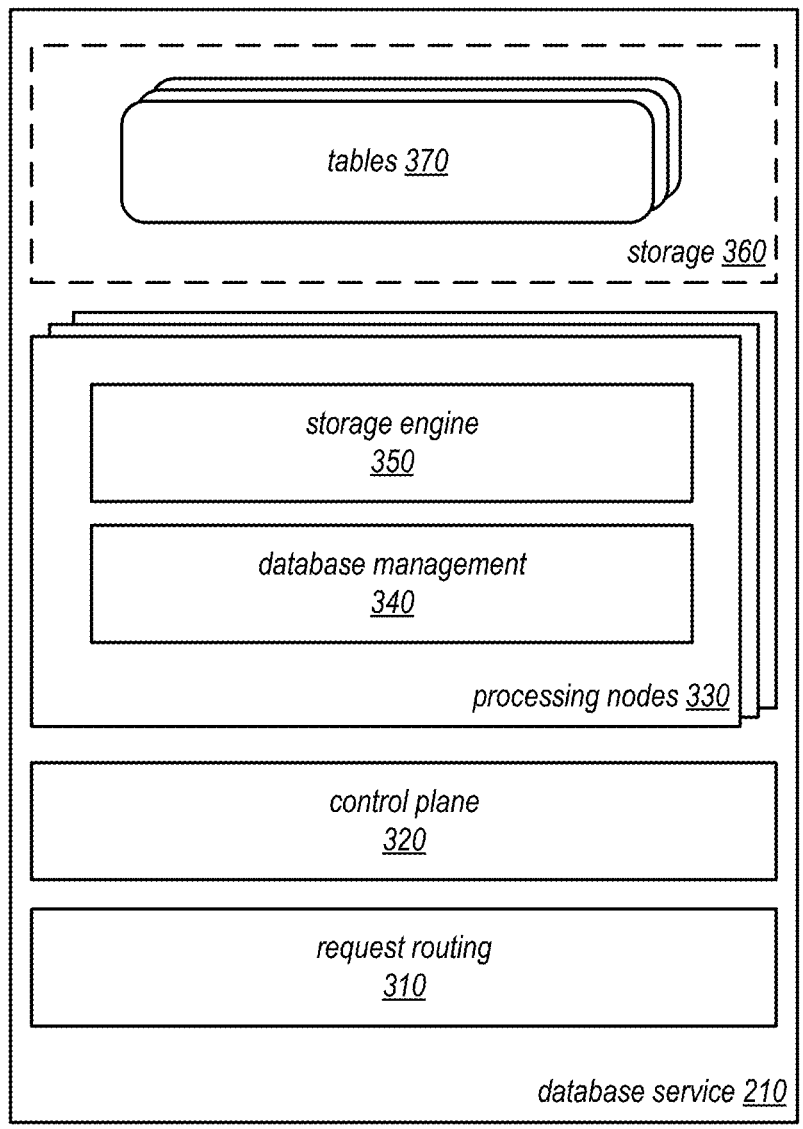
FIG. 3 is a logical block diagram of a database service for which selectively scanning portions of a multidimensional index for processing queries directed to a database may be performed, according to some embodiments.

FIG. 3 is a logical block diagram of a database service for which selectively scanning portions of a multidimensional index for processing queries directed to a database may be performed, according to some embodiments. Database service 210 may implement request routing 310, in one embodiment. Request routing 310 may receive, authenticate, parse, throttle and/or dispatch service requests, among other things, in one embodiment. In one embodiment, database service 210 may implement control plane 320 to implement one or more administrative components, such as automated admin instances which may provide a variety of visibility and/or control functions, as described in more detail herein). In one embodiment, database service 210 may also implement a plurality of processing nodes 330, each of which may manage one or more tables (or partitions of tables or other groups, containers, or collections of items) 370 of a data set (e.g., a database) on behalf of clients/users or on behalf of the data storage service (and its underlying system) which may be stored in storage 360 (on storage devices attached to processing nodes 330) or, in another embodiment, in external storage which may be accessed by processing nodes 330 (e.g., via network connections).

Control plane 320 may provide visibility and control to system administrators, detect split events for processing nodes, and/or anomaly control, resource allocation, in one embodiment. In one embodiment, control plane 320 may also include an admin console, through which system administrators may interact with the data storage service (and/or the underlying system). In one embodiment, the admin console may be the primary point of visibility and control for the data storage service (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 320 may provide an interface or access to information stored about one or more detected control plane events, such as split requests to be processed, at storage 360, in one embodiment.

Control plane 320 may direct the performance of different types of control plane operations among the nodes, systems, or devices implementing database service 210, in one embodiment. For instance, control plane 320 may communicate with processing nodes to initiate the performance of various control plane operations, such as moves, splits, update tables, delete tables, create indexes, etc. . . . . In one embodiment, control plane 320 may update a task registry (or some other table or data structure) with the status, state, or performance information of the control plane operations currently being performed.

In one embodiment, request routing 310 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, database service 210 may support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, request routing 310 may perform parsing and/or throttling of service requests, authentication and/or metering of service requests, dispatching service requests, and/or maintaining a partition assignments that map processing nodes to partitions.

Processing nodes 330 may implement database management 340, in one embodiment. Database management 340 may create, update, define, query, and/or otherwise administer databases, in one embodiment. For instance, database management 340 may maintain a database according to a database model (e.g., a relational or non-relational database model). In one embodiment, database management 340 may allow a client to manage data definitions (e.g., Data Definition Language (DDL) requests to describe column definitions, requests to add item attributes, etc.). In one embodiment, database management 340 may handle requests to access the data (e.g., to insert, modify, add, delete data, or query data, including range queries and other queries discussed in FIGS. 4A through 9 below to utilize a multidimensional index). In one embodiment, database management 340 may also perform other management functions, such as enforcing access controls or permissions, concurrency control, or recovery operations. In one embodiment, database management 340 may send requests to storage engine 350 to access partitions in order to process access requests (e.g., requests to read or scan different partitions or particular items or parts of data within a partition).

In one embodiment, processing nodes 330 may implement storage engine 350 to access tables 370 in storage 360. Storage engine 350 may perform requests on behalf of database management to create, read, update and delete (CRUD) data in a table (or partition of a table), in one embodiment. Storage engine 350 may implement buffers, caches, or other storage components to reduce the number of times storage is accessed, in one embodiment. Storage engine 350 may implement various storage interfaces to access storage 360. For example, in those embodiments where storage 360 is a network-based data storage service, then storage engine 350 may establish a network connection with storage 360 as part of obtaining access to a storage unit (e.g., by submit requests formatted according to a protocol or API to establish the connection). In another embodiment, storage engine 350 may access storage 360 that is internal to or directly attached to processing nodes 330 using storage protocols (e.g., Small Computer Systems Interface (SCSI)) over a bus or other interconnect that directly connects a host implementing storage engine 350 with storage 360).

In one embodiment, database service 210 may provide functionality for creating, accessing, and/or managing tables processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 3. Note also that in one embodiment, one or more processing nodes 330 process access requests on behalf of clients directed to tables. Some of these processing nodes may operate as if they were in a multi-tenant environment, and others may operate as if they were in a single-tenant environment. In one embodiments, processing nodes 330 that operate as in a multi-tenant environment may be implemented on different processing nodes (or on different virtual machines executing on a single host) than processing nodes that operate as in a single-tenant environment.

Figure 4A:
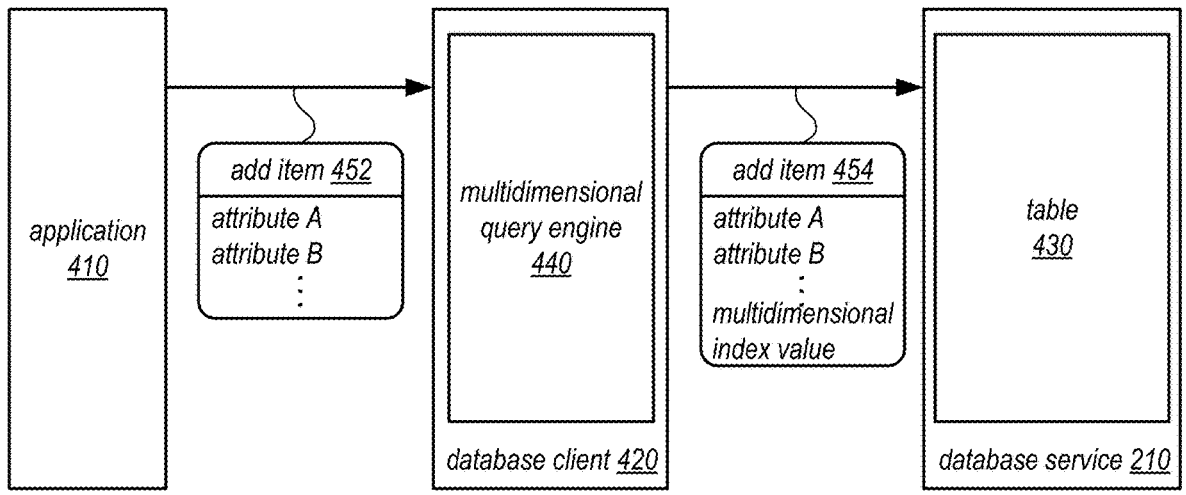
FIGS. 4A-4B are logical block diagrams illustrating interactions to generate a multidimensional index, according to some embodiments.
Figure 4B:
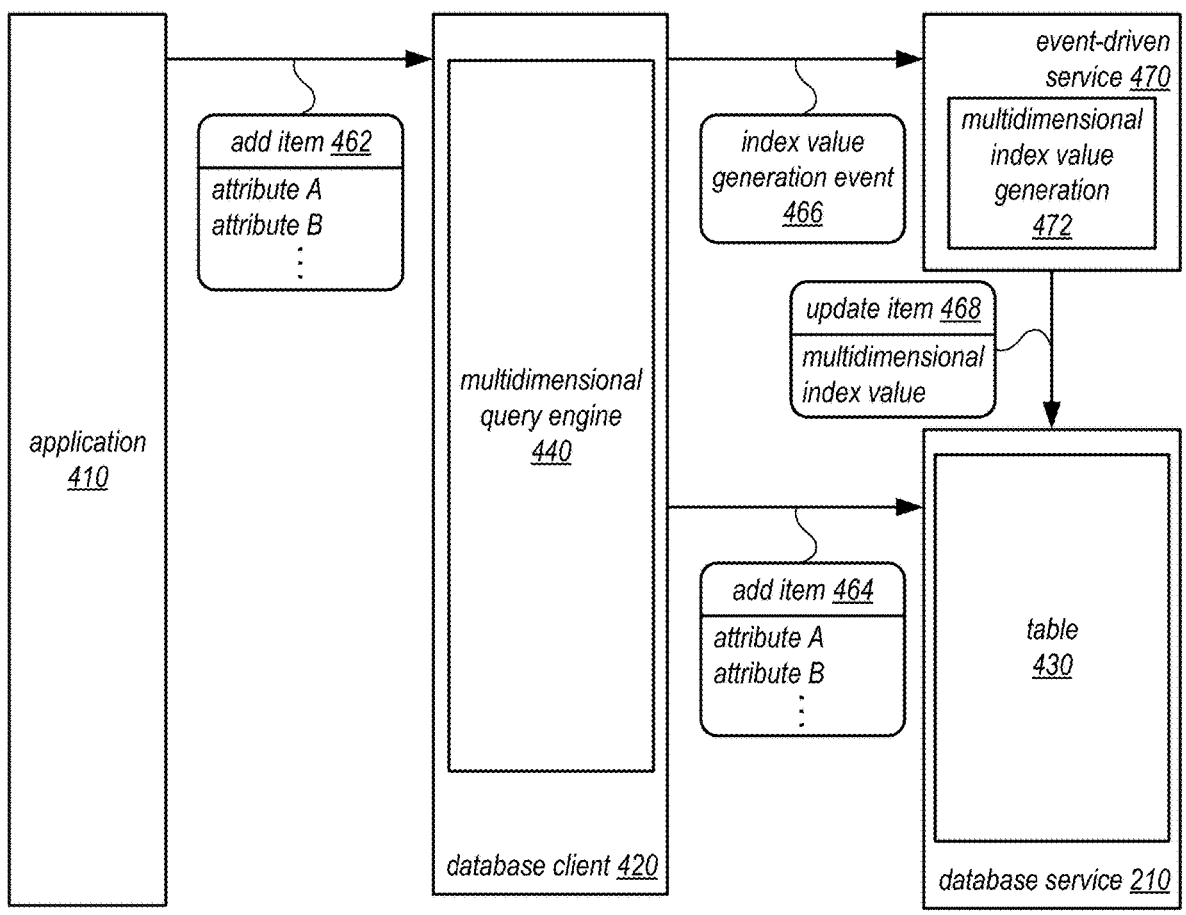

FIGS. 4A-4B are logical block diagrams illustrating interactions to generate a multidimensional index, according to some embodiments. In some scenarios, a database client may generate the multidimensional index without the awareness of an application or database service 210. For example, in FIG. 4A, application 410 may submit a request to add an item 452 to database client 420. Application 410 may be implemented on a same computing system, server, or device as database client 420 (e.g., both implemented as part of a client 250 in FIG. 2) utilizing internal messaging techniques, such as inter-process communication, etc., to send the request to add item 452. For example, database client 420 may be a library, agent, driver, or other component that serves as a database or storage backend for application 410. In other embodiments, database client 420 may be remote from application 410 so that add item request 452 may be sent via network communication (e.g., via HTTP request or network-based programmatic interface, such as an API implemented for database client 420).

Add item request 452 may include the information needed to create the item, such as the required attribute values (as well as non-required values), in a non-relational database, or a new record formatted according to the schema for a table implemented in a relational database service. Database client 420 may implement multidimensional query engine 440 (similar to multidimensional query engine 540 discussed below in FIGS. 5 and 6), to generate a multidimensional index value for the item to be added, in one embodiment. For example, if the multidimensional index is generated according to a space filling curve, then the generation function or technique for the space filling curve may be applied to the attributes of the dimensions included in the multidimensional index value. Database client 420 may then submit a request 454 to database service 210 to add the item to table 430, which includes the multidimensional index value as part of the request 454.

FIG. 4B illustrates a scenario where the task of generating a multidimensional index value can be performed by a separate component or service, in some embodiments. As in FIG. 4A, application 410 may submit an add item request 462, which database client 420 may perform 464 with respect to table 430 in database service 210. However, as illustrated in FIG. 4B, event-driven compute service 470 may be implemented as part of provider network 200. Event driven compute service 470 may implement an event-driven function 472 that performs multidimensional index value generation for input attribute values and updates the item 468 corresponding to the index value generation event 466, in some embodiments. In this way, computationally expensive multidimensional index value generation may be asynchronously performed, so that that the add item request 462 may complete separate from the generation of the multidimensional index value, in some embodiments.

Figure 5:
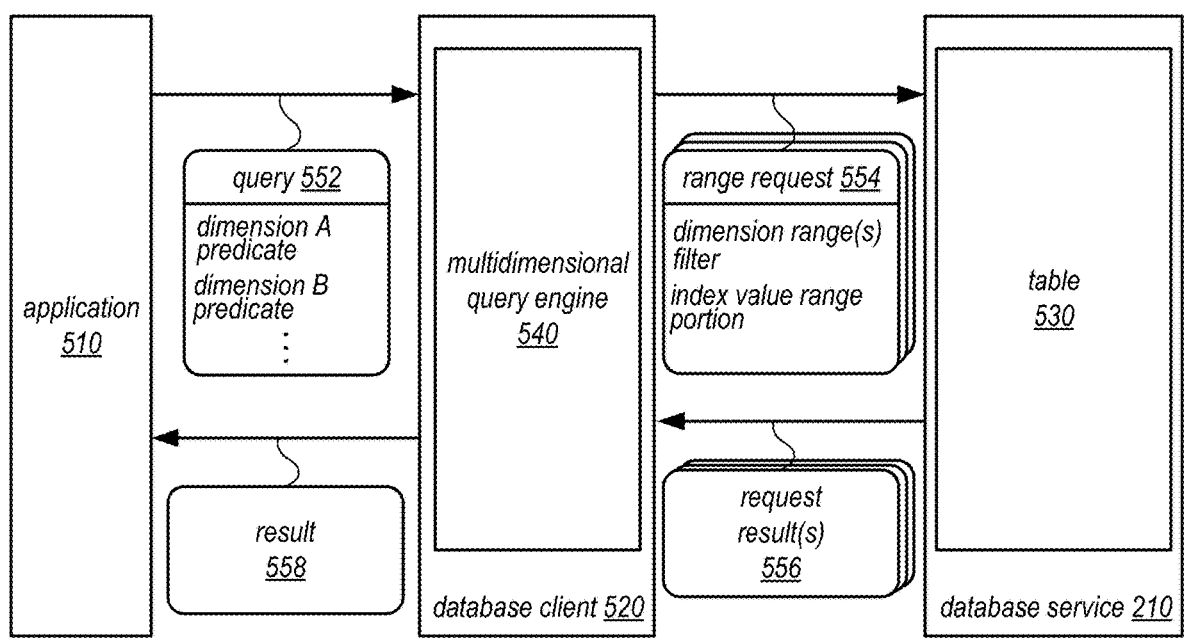
FIG. 5 is a logical block diagram illustrating interactions to process queries selectively scanning portions of a multi-dimensional index, according to some embodiments.

FIG. 5 is a logical block diagram illustrating interactions to process queries selectively scanning portions of a multidimensional index, according to some embodiments. Application 510, similar to application 410 in FIGS. 4A and 4B, may submit a query 552 to database client 520, which may implement multidimensional query engine 540. Query 552 may be a range query or other query that includes one or multiple predicates, such as dimension predicate A, dimension predicate B, and so on. Query 552 may be submitted via a programmatic interface for database client 520 (e.g., an API), or may be sent according to a query protocol or query language (e.g., SQL) which database client 520 may intercept or accept for performing the query for the application at database service 210.

As discussed below in FIGS. 6-8, database client 520 may submit one or multiple range requests 554 directed to table 530 via the interface offered by database service 210. The range requests may include a filter value, such as the ranges of dimension values as determined from the dimension predicates, a portion of the index value range to scan for items (e.g., by indicating a starting value for scanning in the index, a number of items to scan, a number of items to return, a number of index values to scan, a number of data pages or data blocks to scan, an amount of data to scan (e.g., 10 Kb) and/or an end of the range within the multidimensional index). Database service 210 may send back request(s) 556, including items not excluded by the dimension range(s) filter. In some embodiments, request result(s) 556 may indicate when no more remaining portions of the multidimensional index are left to scan. Database client 520 may then provide a result 558 for the query 552 to application 510.

Figure 6:
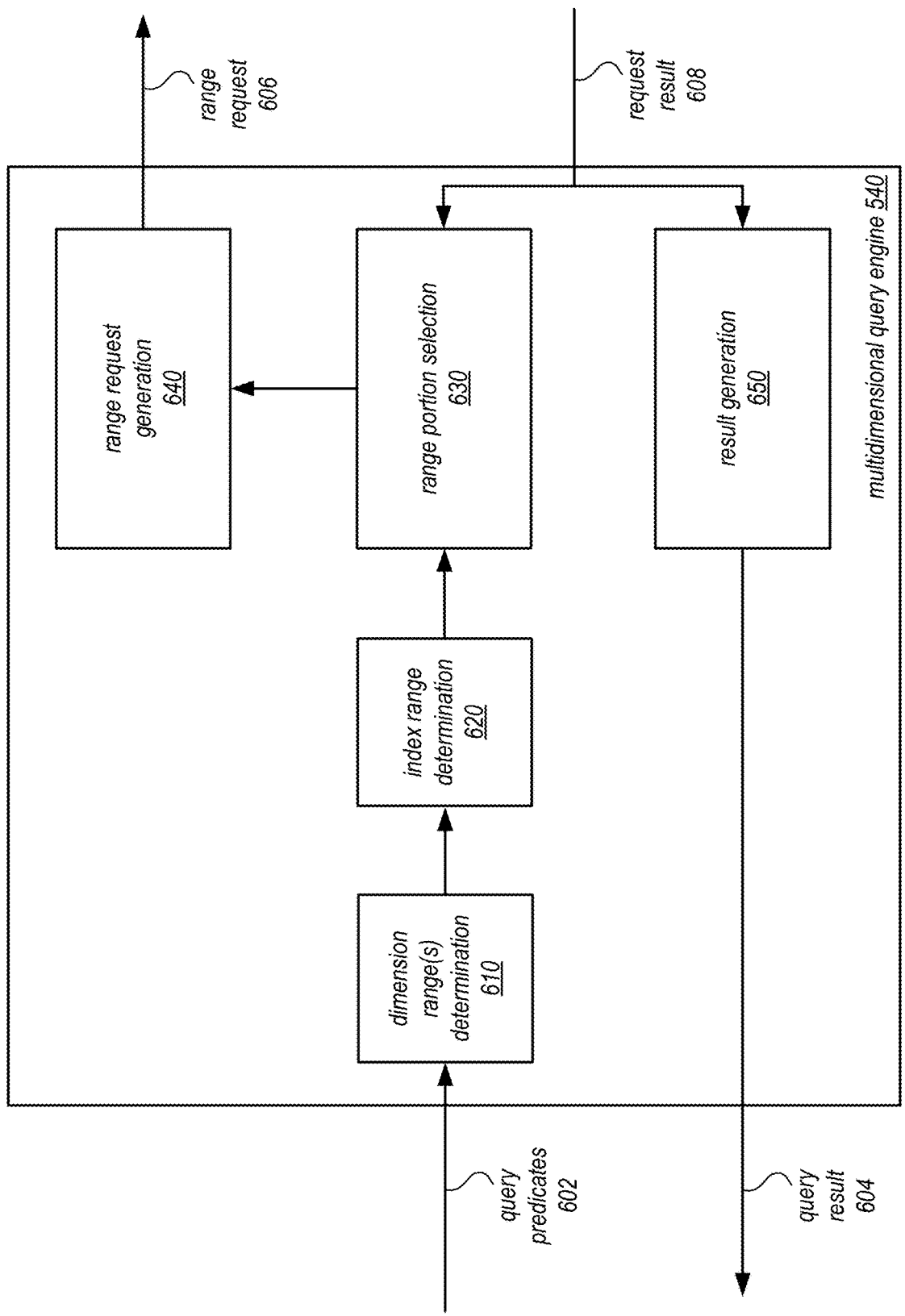
FIG. 6 is a logical block diagram of a multidimensional query engine, according to some embodiments.
Figure 7:
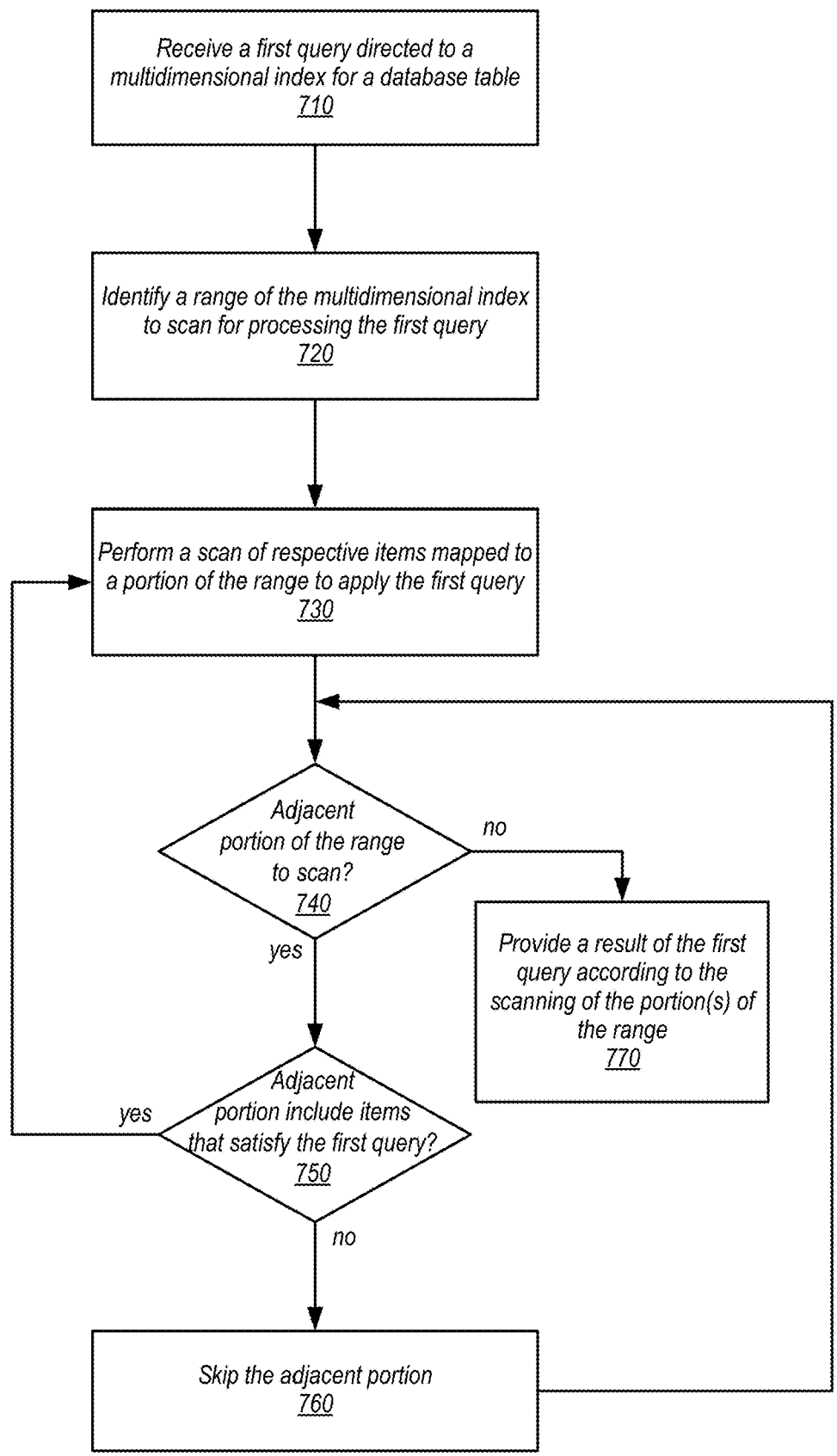
FIG. 7 is a high-level flowchart illustrating various methods and techniques to implement selectively scanning portions of a multidimensional index for processing queries, according to some embodiments.

FIG. 6 is a logical block diagram of a multidimensional query engine, according to some embodiments. For example, multidimensional query engine 540 may be implemented as part of a database client, as illustrated in FIGS. 4A-5, or as part of a query engine implemented within a database management system or service, such as database service 210, in some embodiments. Multidimensional query engine 540 may be implemented as a client library, agent, driver, or other component that may facilitate multidimensional indexing without an application or database system or service being aware of the multidimensional index (as the operations to implement and utilize the multidimensional index are performed within multidimensional query engine 540.

Multidimensional query engine 540 may receive, parse, or extract the query predicates of a query 602, in some embodiments. Multidimensional query engine 540 may implement dimension range determination 610 to determine the ranges of dimensions indicated in the predicates (or not indicated) for which an evaluation of the multidimensional index may be performed. For example, if the query includes predicates of ranges, column A=1 to 5, column B=3 to 7, and column C=9, then the predicate ranges for the corresponding dimensions in the multidimensional index may be identified for columns A, B, and C respectively. If the multidimensional index includes another dimension not specified in a predicate, then the range for that dimension may be determined without reference to a predicate (e.g., column D=min to max).

Multidimensional query engine 540 may implement index range determination to determine the range of index values which may possibly include items that satisfy query predicates 602. For example, index range determination 620 may generate the index values according to a space filling curve, such as Z-index in order to determine the range of Z-index values which may be mapped to items that could satisfy query predicates 602, as discussed below with regard to FIGS. 8 and 9.

Multidimensional query engine 540 may implement range portion selection 630 to select a portion of the range to scan for items and skip portions of the range that do not map to items that can satisfy the query. For example, range portion selection 630 can incrementally evaluate index values in the range to determine whether a given index value is within the dimension ranges determined at 610. In some embodiments, all of the index values included in the dimension ranges can be determined prior to sending range requests by range portion selection 630, whereas in other embodiments, the portions may be dynamically determined and other portions skipped, as discussed below with regard to FIGS. 7 and 8. In some embodiments, range portion selection 630 may perform a brute force scan of the entire determined range (at 620) without skipping any portions.

Range portion selection 630 may intelligently select between the different scanning techniques, in some embodiments, based on query performance history. For example, scanning performance for prior performances of the same query (or similar queries identified according to a similarity analysis, such as a machine based classification technique or vector-based cosine similarity analysis), in one embodiment, may determine which scanning techniques is most optimal. As the content of the database tables may change, the optimality of scanning techniques may change, so performance history for queries may be tracked, updating the type of scanning technique selected each time the query is received, in one embodiment.

As discussed below with regard to FIGS. 7 and 8, the portion of the range may be identified according to a fixed size or may be dynamically determined at the database by limiting the number of results returned for a single range request. In some embodiments, the size or amount of portions within a determined range to scan (e.g., number of items, number of pages, amount of data, etc.) may be determined according to a prior performance of a same (or similar) query (e.g., which may indicate sparse or condensed numbers of portions relevant to a query indicating that the portion size should be increased or decreased). For example, a query similarity model may be generated based on the execution results of prior queries, including the size or amount of portions, execution time, number of portions skipped by applying machine learning or other statistical analyses to train or generate the query similarity model.

In at least some embodiments, range portion selection 630 may specify to range request generation 640 the parameters to include in a range request 606, such as a starting index value for the scan of the multidimensional index values, a limit on a number of items to scan, (c) the dimension ranges as a filter for returning items (e.g., items may have to have dimension values within the ranges), and (d) end of the range (e.g., last index value within the range) in some embodiments. Range request generation 640 may generate range request 606 according to the protocol, language, or programmatic interface implemented for a database in order to perform the requested range scan 606 at the database.

Multidimensional query engine 540 may utilize a request result 608 at both range portion selection 630 and result generation 650. For example, range portion selection 630 may determine whether another portion of the range needs to be scanned or whether processing of the request is complete (e.g., whether an index value is included in request result 608). Result generation 650 may provide a query result 604 based on the request results received 608. In some embodiments, the request results may be aggregated before being sent as single result 604, or may be streamed, in other embodiments.

The examples of selectively scanning portions of a multidimensional index for processing queries as discussed in FIGS. 2-6 above have been given in regard to a client and a database service (which may be a non-relational or NoSQL database service or a relational database service). However, various other types of database systems, data processing systems, data management systems, virtual computing systems or clients thereof may implement electively scanning portions of a multidimensional index for processing queries, in other embodiments. FIG. 7 is a high-level flowchart illustrating various methods and techniques to implement selectively scanning portions of a multidimensional index for processing queries, according to some embodiments. These techniques may be implemented using a client of a database system or service as described above or implemented as part of the database system or service described above with regard to FIGS. 2-6, as well as for other types of databases, storage engines, systems, or clients and thus the following discussion is not intended to be limiting as to the other types of systems that may implement the described techniques.

As indicated at 710, a first query may be received that is directed to a multidimensional index for a database table, in various embodiments. For example, a query may be received in a query protocol or language (e.g., Structured Query Language (SQL)) or according to an application programmatic interface (API), in some embodiments. The query may include predicates, or other information identifying criteria to recognize and return desired data, in one embodiment. The query predicates may identify one (or more) of the dimensions included in the multidimensional index, in one embodiment. For example, the query predicates may include a specific value or range of values for column A, where the multidimensional index includes columns A, B, and C. In some embodiments, the query may be a range query (e.g., indicating ranges of values that satisfy the predicate, such as values 4000 to 4400). A determination or evaluation of the query predicates may be performed to recognize a query that can be processed using the multidimensional index, in some embodiments. For instance, if the query includes no dimensions included in the multidimensional index in its predicate (s), then the query may not be processed using the multidimensional index, in some embodiments.

The multidimensional index may be implemented in different ways. For example, in one embodiment data values may be concatenated or combined from multiple dimensions. In another embodiment, space filling curve function may be used to map the data values (or parts of data values) from different dimensions into a one dimensional space (e.g., a z-order curve, Hilbert curve, etc.). As indicated at 720, a range of the multidimensional index to scan for processing the first query may be identified, in various embodiments. The range of the multidimensional index may be determined based on query predicates, in some embodiments. For example, for a multidimensional index that utilizes a space filling curve, the values that satisfy the predicates for dimensions in the multidimensional index may be determined, so that the corresponding range of values that includes all dimension values satisfying the predicates (as those dimensions values would be mapped to values within the range). In another embodiment, for a multidimensional index that concatenates values, the concatenated values may be generated for the predicates to determine what range of multidimensional index values to scan.

As indicated at 730, a scan of respective items mapped to a portion of the range may be performed to apply the query, in various embodiments. For example, the scanned portion may be selected according to an order in which the multidimensional index values of the index are stored, in one embodiment, such as a lowest or earliest portion of the range. Different portions of the range may be scanned incrementally. The amount or size of the portions scanned may be the same for each iteration of element 730 or may be different. In some embodiments, a query engine may identify or determine a size or portion to scan for each query (e.g., based on statistical analysis or model of queries as part of a cost estimation determined for performing the query). In some embodiments, the size or amount of the scanned portion may be determined based on the number of items found in the scan that satisfy the query (e.g., up to 20 items may be returned in one result response), so the size or amount of the multidimensional index scanned may vary from portion to portion scanned. The number of items found that determines the scanned portion may be modified or adjusted, in some embodiments, between portions, between different queries, or between performances of the same query.

As indicated at 740, a determination may be made after scanning a portion as to whether another portion of the range remains to be scanned, in some embodiments. For example, tracking information identifying the range of the previous portion of items to scan may be maintained in some embodiments (e.g., index values 2010 to 2600 scanned). In at least some embodiments, as discussed below with regard to FIG. 8, a result may be received from a database management system or service performing the scan that indicates whether any portion within the range remains to be scanned. If not, then as indicated at 770, a result for the query may be provided based on the scanning of the portion(s) of the range. For example, items identified in each of the scans may be aggregated and returned as a single result, in one embodiment. Results from each of the scans may be separately returned or streamed, in other embodiments.

If, as indicated by the positive exit from 740, there is an adjacent portion of the range to scan, then a determination may be made as to whether that adjacent portion includes items that satisfy the first query, as indicated at 750, in some embodiments. For example, the multidimensional index values for the adjacent portion can be mapped to possible values for the dimensions included in predicate(s) in the query, in some embodiments (e.g., such as the dimension ranges that satisfy the predicates as discussed below with regard to element 820 in FIG. 8). If an adjacent portion does include items that satisfy the first query, then a scan of that adjacent portion may be performed, as indicated by the positive exit from 750. If not, as indicated by the negative exit from 750, skip the adjacent portion, as indicated at 760. In some embodiments, the adjacent portion may be a single multidimensional index value or group of multidimensional index values, so that adjacent portions may be checked may be skipped until items that satisfy the first query are found at element 750 or now portions remain to be scanned, as indicated by the negative exit from 740. In some embodiments, the range determined at element 720 above may be one of multiple sub ranges of an overall range for processing the query that may be independently scanned (e.g., by parallel processes or threads) according to the techniques described above and the results combined for the query.

Figure 8:
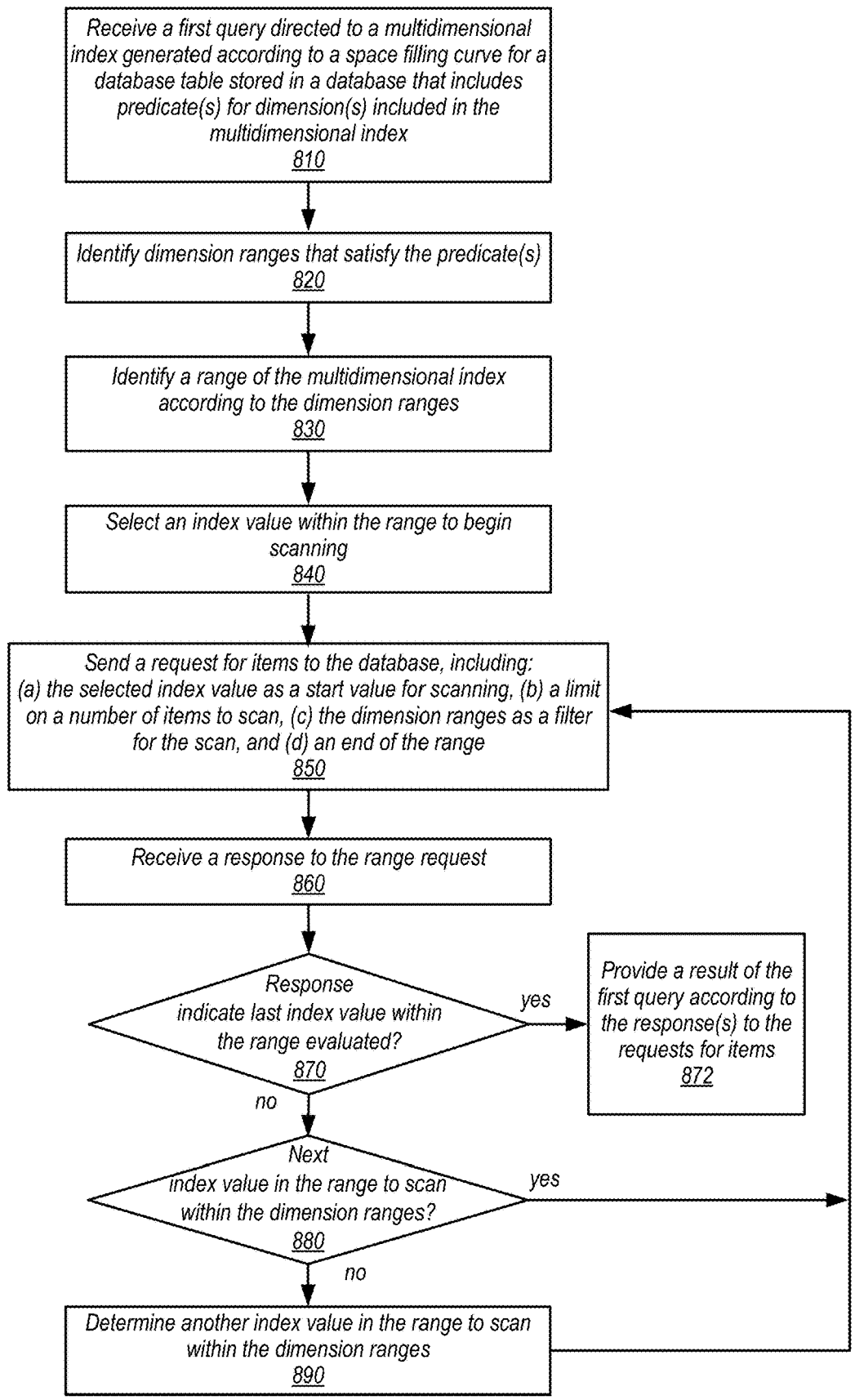
FIG. 8 is a high-level flowchart illustrating various methods and techniques to select portions of a multidimensional index generated from a space filling curve for processing queries, according to some embodiments.

FIG. 8 is a high-level flowchart illustrating various methods and techniques to select portions of a multidimensional index generated from a space filling curve for processing queries, according to some embodiments. As indicated at 810, a first query may be received that is directed to a multidimensional index generated from a space filling curve for a database table that includes predicates for dimensions included in the multidimensional index, in various embodiments. As discussed above with regard to element 710 in FIG. 7, a query may be received in a query protocol or language (e.g., Structured Query Language (SQL)) or according to an application programmatic interface (API), in some embodiments. The query predicates may identify criteria for identifying whether data should be returned in response to the query, in some embodiments. For example, the query predicates may include a specific value or range of values for column A, where the multidimensional index includes columns A, B, and C. In some embodiments, the query may be a range query (e.g., indicating ranges of values that satisfy the predicate, such as values 4000 to 4400).

As indicated at 820, dimension ranges that satisfy the predicate(s) may be determined, in some embodiments. For example, consider a query with predicates specifying an x value between 1 and 3 and a y value between 3 and 4, which indicates a 2-dimensional desired data set for items that fall within the determined ranges. As indicated at 830, as a range of the multidimensional index may be identified according to the dimension ranges, in some embodiments. For instance, in the previous example an item with dimensions [x=1, y=3] may represent a lower bound and an item with dimensions [x=3, y=4] may represent and upper bound. These boundaries may then be translated into multidimensional index values, in some embodiments. For example, if the space filling curve is a z-order curve, and x and y are represented with one byte each, we can translate these items into Z-index values of 11 (001011) and 37 (100101), respectively.

As indicated at 840, an index value within the range may be selected to begin scanning, in some embodiments. For example, the first index value within the range may be selected in one embodiment. In another embodiment, an evaluation of the index values may be performed to find the first index value that can include items that satisfy the first query may be identified. Consider the Z-index example given above. To select the index value, a determination may be made as to whether the test Z-index value falls within the query rectangle created by the minimum and maximum Z-index values (e.g., 11 and 37). Starting with the minimum Z-index of 11, each Z-index can be individually evaluated to determine whether it is relevant to the query, by determining whether the value falls within the dimension range(s) (e.g., query rectangle). The Z-index 11 (001011), for instance, falls within the query rectangle because 11 maps to values of x=1, y=3. However, if the same analysis were to be performed for a next Z-index value of 12 (001100), the Z-index value does not map to an item within the query rectangle, as 12 maps to values of x=2, y=2 (and the predicate for y is values between 3 and 4, so y=2 does not satisfy the predicate).

As indicated at 850, a request may be sent for items to the database that includes: (a) the selected index value as a starting value for the scan of the multidimensional index values, (b) a limit on a number of items to scan, (c) the dimension ranges as a filter for returning items (e.g., items may have to have dimension values within the ranges), and (d) end of the range (e.g., last index value within the range) in some embodiments. In other embodiments, other techniques for identifying the portion of the range to scan may include identifying a number or set of data pages or data blocks. The request may be formatted according to an API or other interface, as discussed above with regard to FIG. 5. The database may receive the request and perform a range scan according to the request, starting with scanning the item associated with the selected index value, and continuing until the limit of items to scan is reached (or the end of the table is reached), in one embodiment. For each item found, the database may apply the dimension ranges as a filter so that only those items with dimension values within the dimension ranges are returned, in one embodiment.

As indicated at 860, a response from the database may be received. The response may indicate whether a last index value within the range has been evaluated, as indicated at 870. For example, if the response includes an index value in the response, then the included index value indicates that the database scanned up to the index value with other items remaining to be scanned, in one embodiment. If the response indicates that the last index value within the range has been evaluated, then no further scan may be needed, as indicated by the positive exit from 870. A result for the first query may be provided according to the response(s) to the requests for items, as indicated at 872, in some embodiments. If the response does not indicate that the last index value within the range has been evaluated, then a determination may be made as to whether the next index value in the range to scan is within the dimension ranges, as indicated at 880. For example, as discussed above at 840, determination may be made as to whether a test Z-index value (the next Z-index value) falls within the query rectangle created by the minimum and maximum Z-index values, in one embodiment. If so, then as indicated by the positive exit from 880, another request to start scanning using the next index value as the start index value may be performed. In some embodiments, all other parameters in the request may stay the same, or in some embodiments, may be dynamically altered (e.g., increasing or decreasing the number of items to scan). If the next index value is not within the dimension ranges, then the index values may be incrementally evaluated until another index value in the range is determined to be with in the dimension ranges, as indicated at 890. A request to the database may then be performed, as indicated by the arrow returning to element 850, in some embodiments.

In order to leverage the benefits provided by a multidimensional index, multidimensional index values for the multidimensional index may need to be generated for items. When a table is created, a column, field, attribute, or other dimension of a database may be identified as a multidimensional index value. In some embodiments, a multidimensional index may be added for a table after the database table is created. For example, a schema for a relational database may be changed to add a column for the multidimensional index and the table resorted according to the multidimensional index values generated for each row, in one embodiment. For a non-relational database (e.g., a NoSQL database), attributes for the multidimensional index values can be added to each item in the database table and the table resorted, in one embodiment.

Figure 9:
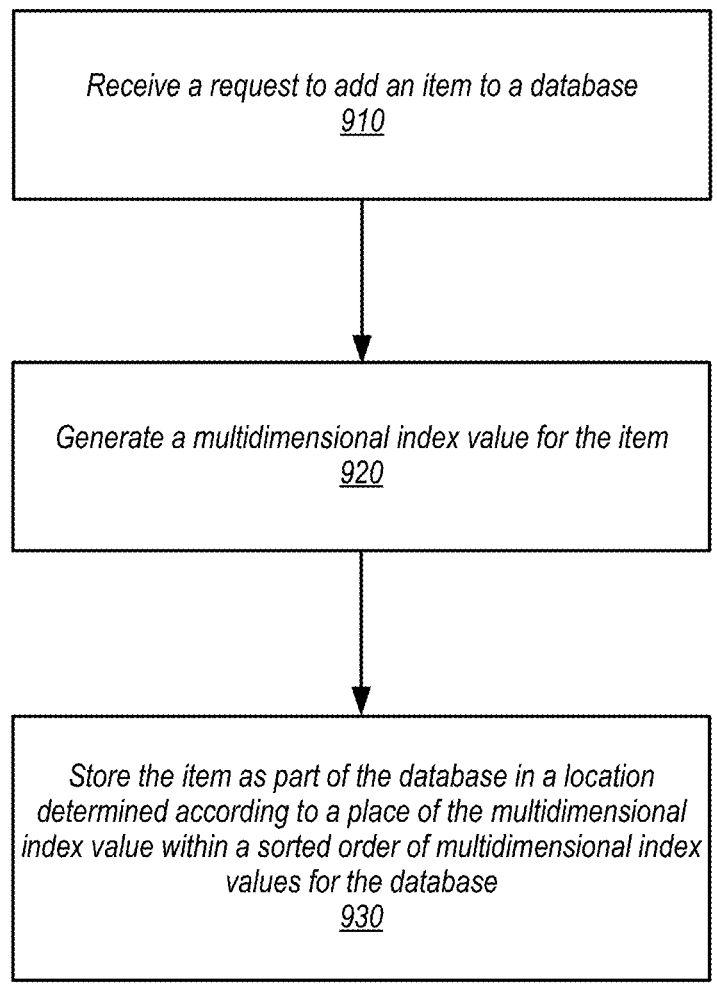
FIG. 9 is a high-level flowchart illustrating various methods and techniques to generate a multidimensional index, according to some embodiments.

Multidimensional index values may also be added when additional data is included in a database table. FIG. 9 is a high-level flowchart illustrating various methods and techniques to generate a multidimensional index, according to some embodiments. As indicated at 910, a request to add an item to a database may be received, in some embodiments. For example, the request may be formatted according to standard protocol or language (e.g., a SQL INSERT statement), in one embodiment. In some embodiments, a request to copy, upload, or otherwise create a new table may be or include a request to add an item to a database. In some embodiments, the request may be formatted according to an API for the database (or a database service like database service 210) to update or add items to a table.

As indicated at 920, a multidimensional index value may be created for the item, in some embodiments. For example, the values of the attributes, fields, or columns of the different dimensions included in the multidimensional index may be parsed, extracted, or otherwise obtained from the request, in one embodiment. Different types of multidimensional indexes may be generated in different ways. For example, in some embodiments, multidimensional indexes may be created by concatenating or combining portions (or all) of the values of the different dimensions (e.g., combining a timestamp field, a latitude field, and a longitude field to create a multidimensional index value TIMESTAMP_LATITUDE_LONGITUDE).

In a least some embodiments, a multidimensional index may be generated according to a space filling curve that maps the different dimensions into a single value, as discussed above with regard to FIG. 1. A z-order or Morton-order curve, a Hilbert curve, a Peano curve, or other mapping function that maps the dimensions of items into one dimension (e.g., a space filling curve), may be used to create the multidimensional index values, in some embodiments. An index value for a z-order curve may be generated, for instance, by repeatedly interleaving bits from the different dimensions, in one embodiment. Consider a scenario where a Z-order index value of a 2D point [x=97, y=214] may be generated. Starting with the leftmost bit of Y, the bits of each dimension may be interleaved, resulting in a 2-byte Z-order index value that comes out to 46,633 in decimal (X value in bits: 01100001, Y value in bits: 11010110, Z address: <u>1</u>0<u>1</u>1 0<u>1</u>1000<u>1</u>0<u>1</u>001—where the bolded, underlined bits are bits from Y). In some embodiments, different numbers of bits may be used or in each dimension. If, for instance, a dimension's bits are exhausted, those bits can be omitted from the rotation (e.g., instead of interleaving bits from 3 columns, interleave bits from the remaining 2 columns with bits left), in one embodiment. Consider another example of generating a Z-index value for the 2D point of [x=97, y=54,813]. Even though X and Y have different numbers of bits, the bits can still be interleaved between the two dimensions to create a three-byte Z-address of 11,938,077 (X value in bits: 01100001, Y value in bits: 1101011000011101, and Z address: <u>1</u>0<u>1</u>1<u>01</u>1000<u>1</u>0<u>1</u>001 000<u>11101</u>—where the bolded, underlined bits are bits from Y).

As indicated at 930, the item may be stored as part of the database in a location determined according to a place of the multidimensional index value within a sorted order of the multidimensional index values for the database, in various embodiments. For example, items in the database may be stored in sorted order according to increasing multidimensional index values (e.g., from 1 to 99,999), in one embodiment. A database management system or service may automatically store the items according to the multidimensional index value by identify the multidimensional index value as a sort key or primary key when a database table is created, in some embodiments.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 10:
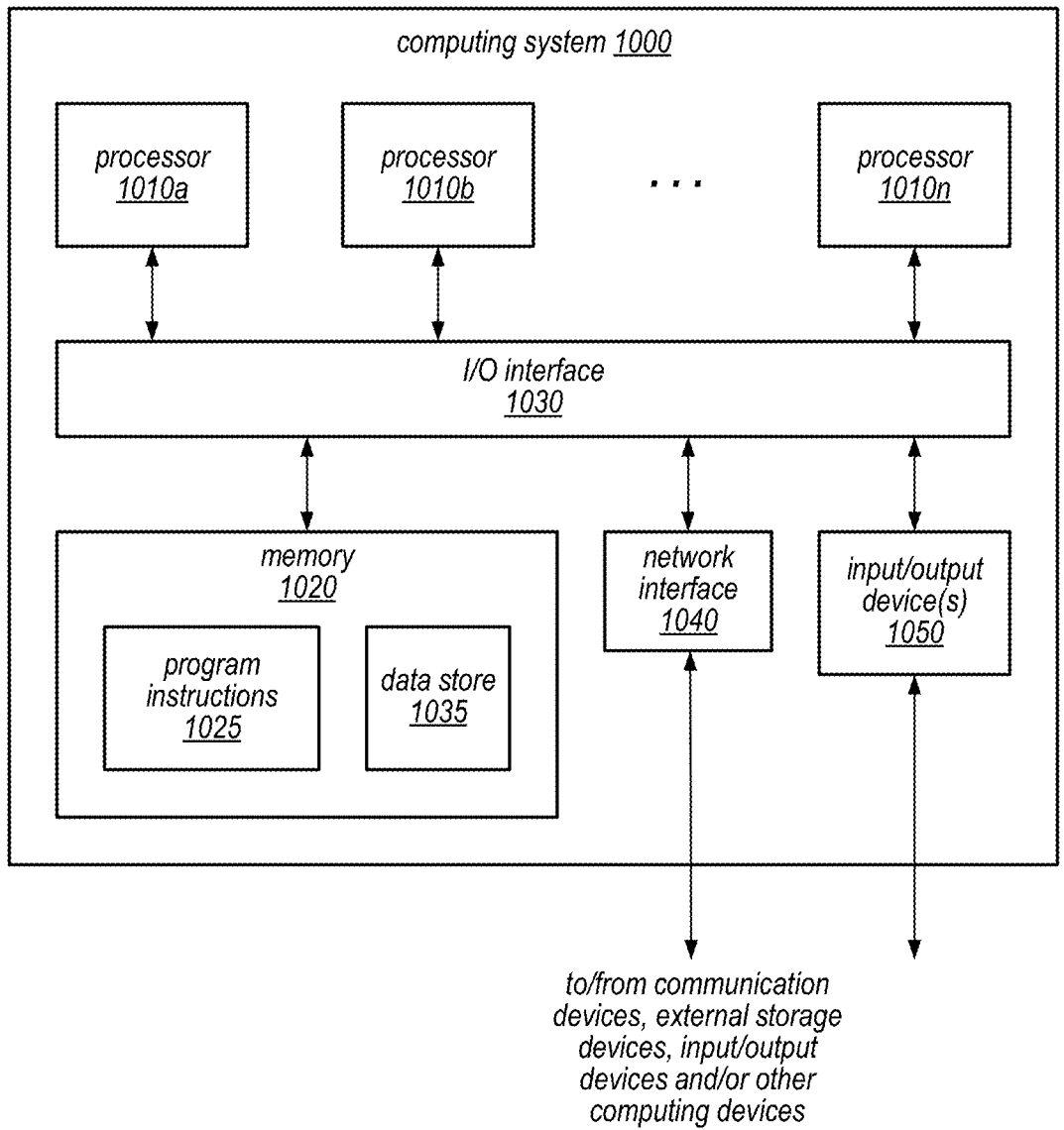
FIG. 10 is a block diagram illustrating an example computing system, according to some embodiments.

Embodiments of selectively scanning portions of the multidimensional index for processing queries as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node, compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that can implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a memory to store program instructions which, if performed by at least one processor, cause the at least one processor to perform a method to at least:
receive, at a database client that implements a multidimensional query engine, a first query from an application directed to a multidimensional index for a database table, wherein the first query includes one or more predicates for one or more dimensions of a plurality of dimensions included in the multidimensional index, and wherein the multidimensional index is generated from the plurality of dimensions according to a space filling curve;
in response to receiving the first query at the database client:
identify, by the database client, one or more dimensional ranges of the one or more dimensions that satisfy the predicates;
identify, by the database client, a range of the multidimensional index to scan for processing the first query based, at least in part, on the identified dimensional ranges, wherein the range of the multidimensional index comprises a plurality of different portions, each including one or more multidimensional index values that satisfy the predicates, and an another portion, adjacent to at least some of the different portions, not including multidimensional index values that satisfy the predicates, and wherein boundaries of the different portions are determined at least in part by the dimensional ranges that satisfy the predicates;
send a request from the database client to a processing node of a database service, the request causing the processing node to access storage that stores the database table to perform a scan of respective items mapped to the different portions of the range of the multidimensional index to apply the first query, wherein the request from the database client comprises an initial multidimensional index value and a filter for the items incorporating the dimensional ranges;
upon receipt of a result of the performance of the scan of the respective items of at least one of the different portions of the range:
determine, by the database client based at least in part on the received result, that a next multidimensional index value to scan lies within the other portion of the range adjacent to the one portion of the range, wherein the next multidimensional index value is not within the dimensional ranges, and wherein the received result excludes items determined, according to the filter, not to satisfy the first query; and
in response to the determination that the next multidimensional index value is not within the dimensional ranges, skip the other portion of the range; and
provide a result of the first query according to the performance of the scans of the respective items of the different portions of the range.

2. The system of claim 1, wherein the method further includes determining a size of one or more of the different portions to scan based at least in part, on a prior performance of a same query as the first query.

3. The system of claim 1, wherein the method further includes:
receiving, at the database client, a request to add an item to the database table;
generating an index value for the item according to the space filling curve; and
storing the item as part of the database table in a location determined according to a place of the index value within a sorted order of index values for the database.

4. The system of claim 1, wherein to perform the scans of respective items mapped to different portions of the range to apply the first query, the database client sends the request to a network-based, non-relational database service that stores the database table.

5. A method, comprising:
receiving, at a database client that implements a multidimensional query engine, a first query from an application directed to a multidimensional index for a database table, wherein the first query includes one or more predicates for one or more dimensions included in the multidimensional index;
performing, by the database client, in response to receiving the first query at the database client:
identifying one or more dimensional ranges of the one or more dimensions that satisfy the predicates;
identifying a range of the multidimensional index to scan for processing the first query based, at least in part, on the identified dimensional ranges, wherein the range of the multidimensional index comprises a plurality of different portions, each including one or more multidimensional index values that satisfy the predicates, and an another portion, adjacent to at least some of the different portions, not including multidimensional index values that satisfy the predicates, and wherein boundaries of the different portions are determined at least in part by the dimensional ranges that satisfy the predicates;
sending a request from the database client to a processing node of a database service, the request causing the processing node to access storage that stores the database table to perform a scan of respective items mapped to the different portions of the range of the multidimensional index to apply the first query, wherein the request from the database client comprises an initial multidimensional index value and a filter for the items incorporating the dimensional ranges;
upon receiving a result of the scanning of the respective items of at least one of the different portions of the range, skipping the other portion of the range that is adjacent to the scanned at least one portion of the range to generate a next multidimensional index to scan, wherein the received result excludes items determined, according to the filter, not to satisfy the first query; and
providing a result of the first query according to the scanning of the respective items of the different portions of the range.

6. The method of claim 5, wherein the method further comprises:
determining that an index value within the adjacent portion of the range is not within the dimensional ranges; and performing the skipping in response to determining that the index value within the adjacent portion of the range is not within the dimensional ranges.

7. The method of claim 5, wherein performing the scans includes selecting an index value as a start value for one portion of the range to scan and identifying a limit for a number of items that can be scanned in the scan of the one portion.

8. The method of claim 7, wherein the limit for the number of items that can be scanned identified for one of the performed scans is different than the limit identified for another one of the performed scans for another portion of the range to scan.

9. The method of claim 5, further comprising:
upon skipping the at least one other portion of the range that is adjacent to the scanned at least one portion of the range and that is determined not to include items that satisfy the first query, determining another portion of the range to scan that can include items that satisfy the first query, wherein the performing the scans includes performing the scan of the determined other portion of the range.

10. The method of claim 5, further comprising selecting, from a plurality of scanning techniques, a technique to perform the identifying of the range of the multidimensional index, the performing the scans, and the skipping the adjacent portion, based at least in part, on a prior performance of a same query as the first query.

11. The method of claim 5, further comprising:
receiving, at the database client, a request to add an additional item to the database table;
generating an index value for the additional item according to a space filling curve; and
storing the additional item as part of the database table.

12. The method of claim 11, further comprising:
sending an event invoking a function to generate the index value for the additional item to an event driven computing service, wherein the event driven computing service performs the generating the index value in response to the event; and
updating, by the event driven computing service, the additional item in the database table to include the index value.

13. The method of claim 5, wherein a network-based database service stores the database table, and wherein performing the scans of respective items mapped to the different portions of the range to apply the first query comprises sending range requests from the database client to the network-based database service that indicate a starting value for the portion of the range and a limit on a number of items to be scanned before returning a result.

14. A non-transitory, computer-readable storage medium, storing program instructions that when executed by one or more computing devices cause the one or more computing devices to implement:
receiving, at a database client that implements a multidimensional query engine, a first query from an application directed to a multidimensional index for a database table, wherein the first query includes one or more predicates for one or more dimensions included in the multidimensional index;
performing, by the database client, in response to receiving the first query at the database client:
identifying one or more dimensional ranges of the one or more dimensions that satisfy the predicates;
identifying a range of the multidimensional index to scan for processing the first query based, at least in part, on the identified dimensional ranges, wherein the range of the multidimensional index comprises a plurality of different portions, each including one or more multidimensional index values that satisfy the predicates, and an another portion, adjacent to at least some of the different portions, not including multidimensional index values that satisfy the predicates, and wherein boundaries of the different portions are determined at least in part by the dimensional ranges that satisfy the predicates;
sending a request from the database client to a processing node of a database service, the request causing the processing node to access storage that stores the database table to perform a scan of respective items mapped to the different portions of the range of the multidimensional index to apply the first query, wherein the request from the database client comprises an initial multidimensional index value and a filter for the items incorporating the dimensional ranges;
upon receiving a result of the scanning of the respective items of at least one of the different portions of the range, skipping the other portion of the range that is adjacent to the scanned at least one portion of the range to generate a next multidimensional index to scan, wherein the received result excludes items determined, according to the filter, not to satisfy the first query; and
providing a result of the first query according to the scanning of the respective items of the different portions of the range.

15. The non-transitory, computer-readable storage medium of claim 14, wherein the range is one of a plurality of ranges in the multidimensional index identified for processing the first query, and wherein the identifying the dimensional ranges, the identifying of the range of the multidimensional index, the performing the scans, and the skipping the adjacent portion are independently performed for each range of the plurality of ranges.

16. The non-transitory, computer-readable storage medium of claim 14, wherein the program instructions cause the one or more computing devices to further implement in response to receiving the first query at the database client:
determining a size of one or more of the different portions to scan based at least in part, on a prior performance of a same query as the first query.

17. The non-transitory, computer-readable storage medium of claim 14, wherein the multidimensional index is generated according to a Z-order curve.

18. The non-transitory, computer-readable storage medium of claim 14, wherein the program instructions cause the one or more computing devices to implement:
receiving, at the database client, a request to add an additional item to the database table;
generating an index value for the additional item according to the space filling curve; and
storing the additional item as part of the database table.

19. The non-transitory, computer-readable storage medium of claim 14, wherein a network-based database service stores the database table, and wherein the request from the database client includes the dimensional ranges as a filter for the respective items.

* * * * *